United States Patent [19]

Speicher et al.

[11] Patent Number: 4,567,782

[45] Date of Patent: Feb. 4, 1986

[54] COMPOUND PARALLELOGRAM FOUR-BAR LINKAGE

[75] Inventors: John M. Speicher, Upland; Allan A. Voigt, Anaheim, both of Calif.

[73] Assignee: General Dynamics Pomona Division, Pomona, Calif.

[21] Appl. No.: 645,784

[22] Filed: Aug. 30, 1984

Related U.S. Application Data

[63] Continuation of Ser. No. 251,428, Apr. 6, 1981, abandoned.

[51] Int. Cl.⁴ .............................................. F16H 21/44
[52] U.S. Cl. .......................................... 74/96; 74/519
[58] Field of Search ................ 74/96, 99, 42, 43, 469, 74/496, 519

[56] References Cited

U.S. PATENT DOCUMENTS

| | | | |
|---|---|---|---|
| 57,690 | 9/1866 | Doyle | 74/42 |
| 103,971 | 6/1870 | Bradford | 74/96 |
| 116,464 | 6/1871 | Lufkins | 74/42 |
| 512,764 | 1/1894 | Teate | 74/42 |
| 682,935 | 9/1901 | Holmberg | 74/42 |
| 769,327 | 9/1904 | Sheline | 74/32 |
| 1,032,084 | 12/1913 | Gilbert | 294/26.5 |
| 1,047,785 | 12/1912 | Gilbert | 74/96 |
| 1,796,033 | 3/1931 | Lee | 74/99 |
| 1,945,662 | 2/1934 | Sneed | 74/519 |
| 2,228,400 | 1/1941 | Otto | 74/43 |
| 2,734,710 | 2/1956 | Noble | 74/96 |
| 3,520,210 | 7/1970 | Tarrant | 74/496 |
| 3,783,706 | 1/1974 | Ogawa et al. | 74/469 |

FOREIGN PATENT DOCUMENTS 724847  3/1980  U.S.S.R. ............................. 74/469

OTHER PUBLICATIONS

Ingenious Mechanisms for Designers & Inventors, vol. IV, pp. 246-247, 1st Printing 1967.

Primary Examiner—Lawrence J. Staab
Attorney, Agent, or Firm—Neil F. Martin; John R. Lindsay; Edward B. Johnson

[57] ABSTRACT

A compound parallelogram four-bar linkage is provided wherein a first primary link is connected to a second primary link through connector links of substantially the same length and the pivotal angles of the first primary link and second primary link are maintained at substantially ninety degrees as movement is transferred from one primary link to the other so that the resonant frequency of the linkage does not vary and the linkage stiffness is independent of the angle of rotation.

3 Claims, 8 Drawing Figures

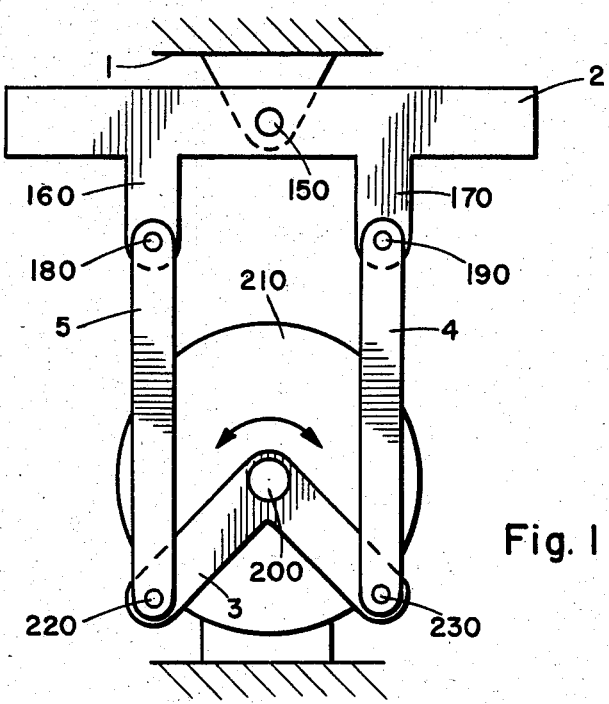
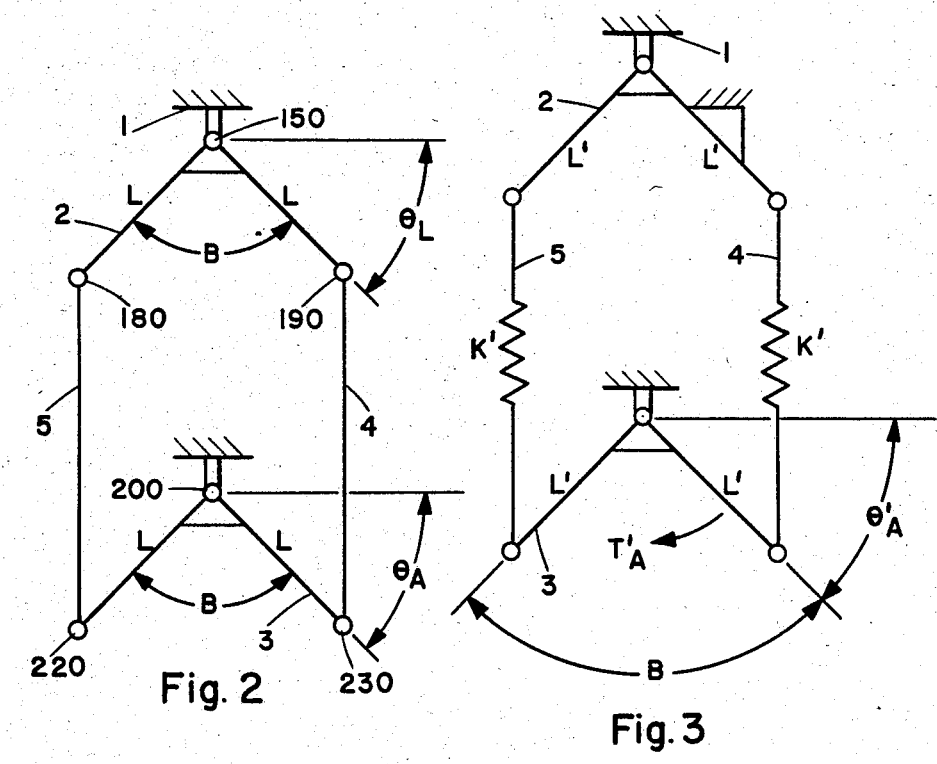
Fig. 1
Fig. 2
Fig. 3

COMPOUND PARALLELOGRAM FOUR-BAR LINKAGE

This application is a continuation of Ser. No. 251,428, filed Apr. 6, 1981, now abandoned.

BACKGROUND OF THE INVENTION

Standard four-bar parallelogram linkages are widely used. These devices have limited angular range capacity and their stiffness varies with angle. In such linkages, the links will deform in use. This deformation introduces linkage resonances which is a disadvantage when using such linkages in high performance servo control loops.

Also, conventional four-bar parallelogram linkages are limited in use to less than ninety degrees rotation because at the ninety degree point they can invert and lose their proper angular orientation. This is a serious problem in control mechanism,s particularly in an arrangement such as a high performance servo control loop.

A solution to these problems has been sought which would provide a linkage with large angle capability and with constant stiffness.

SUMMARY OF THE INVENTION

The disadvantages of the prior art are overcome by the device of the present invention which includes a first primary pivotal link means wherein the pivot points form a ninety degree angle, a second primary pivotal link means wherein the pivot points form a ninety degree angle, and connector means which connects the first primary link means with the second primary link means, whereby rotation of one primary link means creates rotation of the other primary link means without varying the resonant frequency range, and the stiffness of the linkage is independent of its angle of rotation.

DESCRIPTION OF THE DRAWINGS

FIG. 1 is a side elevation view of the parallelogram linkage of the present invention.

FIG. 2 is a diagram which illustrates the linkage of FIG. 1 schematically.

FIG. 3 is a diagram illustrating the loading of the linkage shown in FIG. 1.

DETAILED DESCRIPTION OF THE INVENTION

Figure 4:
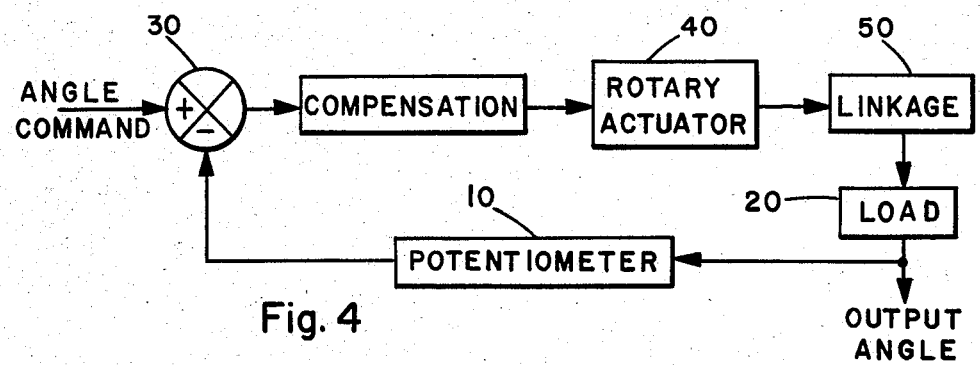
FIG. 4 is a block diagram of a typical electromechanical servo loop.

The linkage device of the present invention is precise and is capable of use in systems requiring large angle capability and constant linkage stiffness such as a servo loop for example. A typical servo loop system is demonstrated in FIG. 4 of the drawings and includes a potentiometer 10 coupled to a load 20 for sensing error outputs from the load. The potentiometer 10 is coupled through an angle command module 30 to compensate in accordance with the error signal from the potentiometer 10 through a rotary actuator 40, such as an electric motor, that is coupled to linkage 50 to provide an adjustment to the load in response to the error signal.

Figure 5:
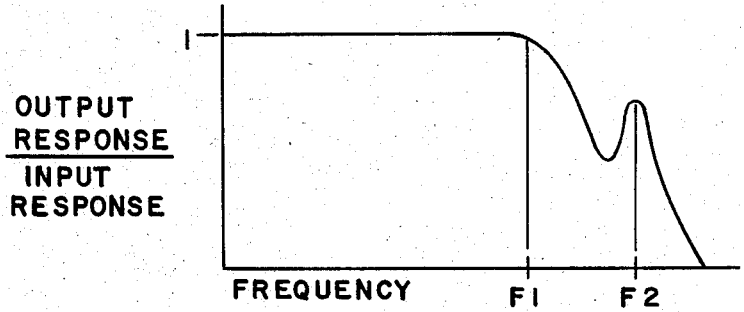
FIG. 5 is a graph of the bode response of the servo loop shown in FIG. 4.

The bode response of this typical system is represented by the curve shown in FIG. 5. The band width of such a loop is limited by the resonance F2 of the linkage 50. The band width of the loop would typically be limited near F1. If the stiffness of the linkage were to drop, the linkage resonance F2 could drop into the band width of the loop, less than F1, and the loop would become unstable.

Figure 6:
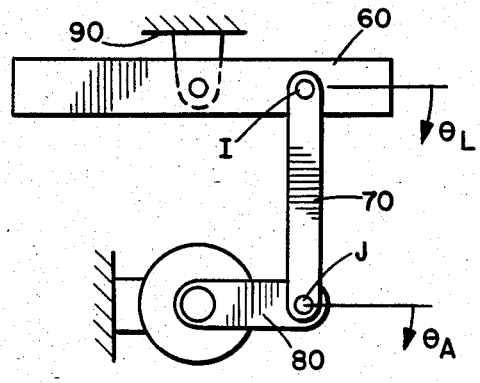
FIG. 6 is a side elevation view showing a conventional four-bar linkage which is commonly used.
Figure 8:
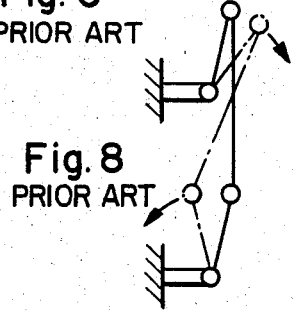
FIG. 8 is a schematic diagram illustrating the reversing toggle action of the construction shown in FIG. 6.
Figure 7:
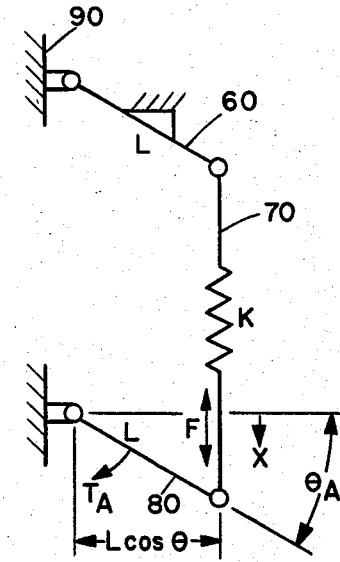
FIG. 7 is a schematic diagram representing the linkage of FIG. 6.

A standard four-bar parallelogram linkage is demonstrated in FIGS. 6–8 of the drawings. This type of linkage is widely used. It includes links 60, 70, 80 and 90. A characteristic of the linkage is that the actuator angle $\theta A$ and the load angle $\theta L$ are always theoretically equal. However, actual linkages have deformable links. Usually, most of this deformation can be attributed to compression and extension of link 70 and deformation in the bearings at points I and J. This deformation can be represented by the linear spring having linear spring constant K as shown in the schematic diagram of FIG. 7 of the drawings. The torsional spring constant $K\theta$ of the spring can be calculated as follows.

Assuming that link 60 is rigidly held, the torsional spring constant would then be equal to the torque applied to link 80 by the motor (TA) divided by the angular deflection of link 80($\Delta\theta A$). Therefore:

$$K\theta = TA/\Delta\theta A \tag{1}$$

$$TA = F(L \cos \theta A) \tag{2}$$

$$F = K\Delta X = K(L \cos \theta A)\Delta\theta A \tag{3}$$

$$K\theta = \frac{K(L\cos\theta A)^2 \Delta\theta A}{\theta A}$$

$$K\theta = KL^2 \cos^2 \Delta(\theta A) \tag{5}$$

It will be readily seen that the torsional stiffness of the linkage is a function of the linkage angle and approaches zero as the angle of the linkage approaches plus or minus ninety degrees. This is a serious disadvantage for the linkage when it is used as part of a mechanical drive in a servo loop. As the stiffness of the drive linkage decreases; the natural resonant frequency of the mechanical system drops, thus limiting the band width of the servo system.

Another disadvantage is that the linkage is limited in its operation to angles less than plus or minus ninety degrees because at the "toggle point", the linkage can invert as shown in FIG. 8, passing from the solid line position to the dotted line position, thus losing its proper angular orientaton.

The above disadvanages are overcome by the compound parallel linkage demonstrated in FIGS. 1 and 2 of the drawings. This construction includes link 1, a first primary link 2, a second primary link 3, and two connector links 4 and 5. The first primary link 2 is pivotally connected to link 1 at pivot point 150. It also includes two downwardly extending bosses 160 and 170 having pivot points 180 and 190. The angle (FIG. 2) formed by these pivot points is ninety degrees. The two connector links 4 and 5 are pivotally connected at pivot points 180 and 190.

The second primary link 3 is substantially in the shape of an inverted V and is connected to shaft 200 of electric motor 210. The connector links 4 and 5 of equal length are pivotally connected to the second primary link 3 at the pivot points 220 and 230. The three pivot points formed by the pivot points 220 and 230 and the pivotal connection of the second primary link 3 to the motor shaft 200 form a ninety degree angle at the axis of the motor shaft. As shown in FIGS. 2 and 3 of the drawings, the distance L between pivot point 150 and pivot point 180, the distance between pivot point 150 and pivot point 190, the distance between pivot point 200 and pivot point 220 and the distance between pivot point 200 and 230 are all equal.

This construction forms a compound parallelogram four-bar linkage including what amounts to a dual set of four-bar parallelogram linkage systems. As one set of links approaches a "toggle point", the other set of links will prevent the linkage from inverting. The linkage is sized precisely into parallelograms to prevent binding.

If the deformation characteristics of this system are modeled as was done in FIG. 7 with a single four-bar parallelogram linkage and the load is held rigidly to ground in order to calculate the torsional spring constant $K\theta'$, the schematic shown in FIG. 3 of the drawings results. In this instance, B is a fixed angle chosen by the designer and $\theta'A$ varies as the actuator and load rotate. Building on the previous analysis and using the laws which govern the addition of spring stiffness, the following results are obtained:

$$K'\theta 2,4,3, (\text{FROM LINKS } 2,4,3) = K'L'^2 \cos^2(\theta'A) \quad (6)$$

$$K'\theta 2,5,3 (\text{FROM LINKS } 2,5,3,) = K'L'^2 \cos^2(\theta'A+B) \quad (7)$$

$$K'\theta (\text{TOTAL STIFFNESS}) = K'\theta 2,4,3, + K'\theta 2,5,3 \quad (8)$$

$$K'\theta = K'L'^2[\cos^2(\theta'A) + \cos^2(\theta'A+B)] \quad (9)$$

It will be noted that the stiffness of the linkages varies with both $\theta'A$ and B. However, if B is chosen to be ninety degrees, the following can be stated:

$$B = 90° \quad (10)$$

$$\cos(\theta A + 90°) = \sin(\theta'A) \quad (11)$$

$$K'\theta = K'L^2[\cos^2(\theta'A) + \sin^2(\theta'A)] \quad (12)$$

$$K'\theta = K'L'^2 \quad (13)$$

This demonstrates that if B is chosen as ninety degrees, the linkage stiffness becomes independent of its angle of rotation. Therefore, the linkage resonant frequency does not vary and the linkage transfers motion precisely, which renders it usable in systems requiring a high linkage stiffness and resonate frequency such as high performance servo systems. Rotation of shaft 200 by motor 210 transfers motion to the first primary link or output link 2 through the connector links 4 and 5 and second primary link 3 throughout a wide range of angles without binding and distorting.

While the present invention has been illustrated and described by means of a particular embodiment and application, it is to be understood that changes and modifications may be made therein without departing from the spirit and scope of the invention as defined in the appended claims.

We claim:

1. A linkage for transmitting oscillatory motion from a rotatable actuator to a rotatale load, comprising:
   a first four-bar parallelogram linkage connectable between the actuator and the load;
   a second four-bar parallelogram linkage connectable between the actuator and the load;
   each of said first and second four-bar parallelogram linkages comprising a first link connectable to the actuator, a second link connectable to the load, and an interconnecting link joining said first and second links;
   the first links of each of said four-bar parallelogram linkages being joined together to form therebetween a ninety degree angle;
   said second links of each of said four-bar parallelogram linkages being joined together to form therebetween a ninety degree angle, and
   each of said first and second links and said interconnecting links being of equal length;
   whereby the angular orientation of the linkage is maintained and the stiffness presented by the linkage is substantially independent of the angular position of the actuator.

2. A linkage as recited in claim 1 wherein:
   said first links of each of said four-bar parallelogram linkages comprise a first primary link having a mid-pivot point and two lateral pivot points equally spaced from said mid-pivot point and forming said 90 degree angle at said mid-pivot point; and
   said second links of each of said four-bar parallelogram linkages comprise a second primary link having a mid-pivot point and two lateral pivot points equally spaced from said mid-pivot point and forming said 90 degree angle at said mid-pivot point.

3. A linkage as recited in claim 1, wherein:
   said first links of each of said four-bar parallelogram linkages comprise a first primary link having an angular shape with a mid-pivot point at the apex connectable to the rotary actuator;
   said first primary link having a lateral pivot point spaced toward each end of said first primary link and equally spaced from said mid-pivot point;
   said three pivot points of said first primary link forming said 90 degree angle at said apex pivot point;
   said second links of each of said four-bar parallelogram linkages comprise a second primary link having an elongated rectangular shape connectable to the rotary load and having a mid-pivot point therein;
   said rectangular link having two downwardly extending bosses, each with a lateral pivot point therein equally spaced from said mid-pivot point; and
   said three pivot points forming said 90 degree angle at said mid-pivot point.

* * * * *